United States Patent [19]

Kekas et al.

[11] 4,208,081

[45] Jun. 17, 1980

[54] EASILY RECONFIGURABLE DATA ENTRY TERMINAL

[75] Inventors: Dennis H. Kekas, Raleigh; Robert C. Lynch, Cary; James A. Mathewson; Ronald P. McAdams, both of Raleigh; Harry Pasterchick, Jr., Cary, all of N.C.

[73] Assignee: International Business Machines Corporation, Armonk, N.Y.

[21] Appl. No.: 745

[22] Filed: Jan. 3, 1979

[51] Int. Cl.² .............................................. G06C 7/02
[52] U.S. Cl. ................................. 339/31 R; 235/146; 340/365 R; 400/682
[58] Field of Search ............... 235/145 R, 145 A, 146; 361/394; 400/682, 91–94; 339/65, 28, 31 R; 340/365 R

[56] References Cited

U.S. PATENT DOCUMENTS

| | | | |
|---|---|---|---|
| 2,278,280 | 3/1942 | Pfeiffer et al. | 339/64 M |
| 3,823,388 | 7/1974 | Chadima, Jr. et al. | 364/900 |
| 3,990,565 | 11/1976 | Felton et al. | 400/682 |

OTHER PUBLICATIONS

IBM Tech. Discl. Bulletin, Kolpek, vol. 16, No. 5, p. 1392, 10-1973.

*Primary Examiner*—Neil Abrams
*Attorney, Agent, or Firm*—Gerald R. Woods

[57] ABSTRACT

A data entry terminal has a base unit and keyboard unit which can be assembled to provide an integrated configuration or separated to provide a distributed configuration. No tools are required. The base unit has a recess with vertical guides and a protruding electrical connector providing an input path to the device electronics. The keyboard unit has complementary guides and a connector which mates with the base unit connector when the keyboard unit is slipped into place along the guides. The terminal is readily converted from an integrated configuration to a distributed configuration by removing the keyboard unit from the base unit, adding an auxiliary cable to carry signals between the keyboard unit connector and the base unit connector and concealing the base unit recess with a filler panel having the same guide structure as the keyboard unit.

7 Claims, 7 Drawing Figures

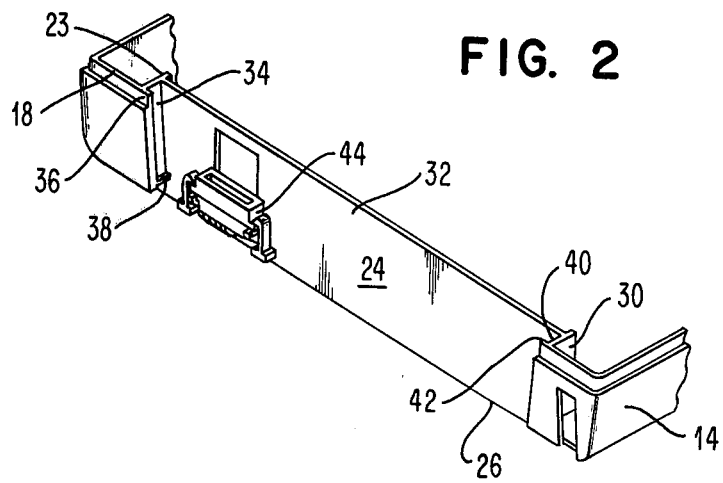
FIG. 2
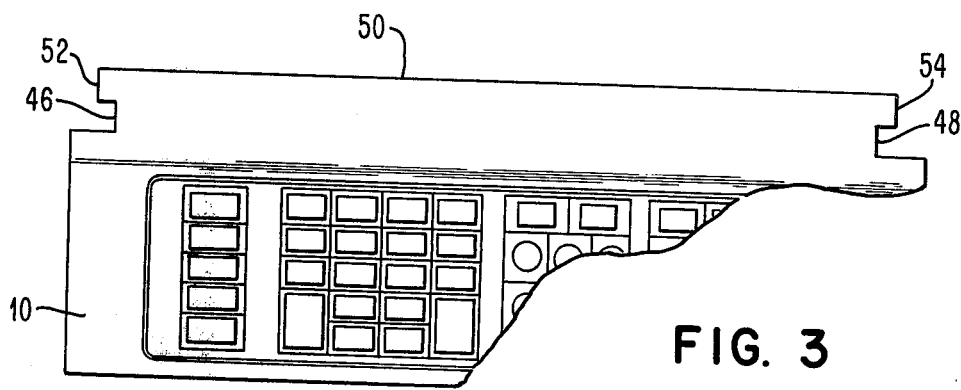
FIG. 3
FIG. 4
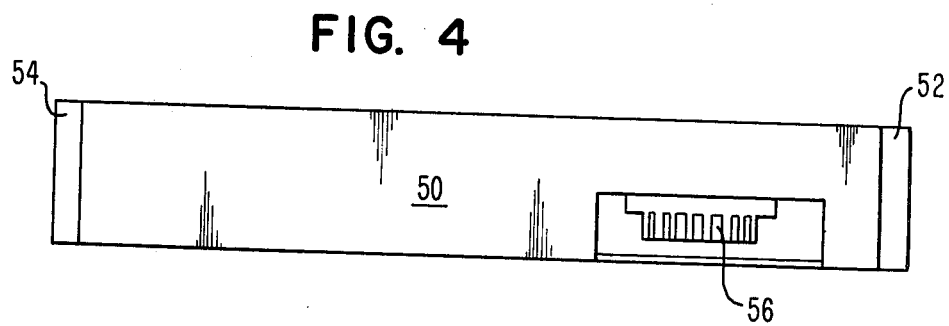

EASILY RECONFIGURABLE DATA ENTRY TERMINAL

TECHNICAL FIELD

The present invention relates to data processing and more particularly to a data entry terminal which can be readily converted from an integrated configuration to a distributed configuration, or vice versa, without the use of tools.

Data entry terminals for use in certain environments, such as supermarkets or retail stores, are often made available to customers in either an integrated configuration or a distributed configuration. An integrated terminal has all of the terminal components (keyboard, display, electronic housing, and the like) either in a single housing or at least connected together as one unit. A distributed terminal, on the other hand, may have a display in one place, a keyboard in another place, the electronics housing in still another place, and so on.

The advantage of a distributed terminal configuration is that the customer can arrange the terminal components in the way he feels is most efficient for his particular operation. Of course, if the customer feels that it is most efficient to have all of the terminal components in one place, as may be the case for certain types of retail stores, that customer would select an integrated terminal configuration over a distributed configuration.

To meet their customers' requirements, manufacturers of data entry terminals have tried to provide both integrated and distributed versions for use in a particular environment. Some manufacturers have done this by providing both an integrated terminal in which the terminal components are contained within a single housing and a distributed terminal having a free-standing keyboard connected to a free-standing electronic housing through an electrical cable.

The drawbacks to this type of approach are clear. Initially, two different products have to be developed by the manufacturer. Spare parts for both types have to be stocked and service personnel have to be trained to maintain both types of terminals. Moreover, if a customer decides that the terminal he initially acquired does not have the right configuration for his purposes, the terminal manufacturer may have to replace the customer's terminals with different terminals on a one for one basis to keep the customer's good will. Even if the customer is willing to pay for the apparent conversion costs, the manufacturer still suffers hidden costs in terms of production scheduling disruptions, spare parts stocking and restocking costs, and the like.

Other manufacturers have attempted to meet the requirement for both integrated and distributed configurations of a data entry terminal by marketing only what amounts to a distributed configuration. The customer is told that he can provide his own integrated configuration simply by grouping the keyboard, display, electronics housing and any other components in one place. While this approach might solve some of the manufacturer's design and maintenance problems, it may also produce an unhappy customer. If freestanding terminal components are simply gathered into a single place, the results may be less than aesthetically pleasing, which can be important in selling devices for retail store and supermarket applications. Moreover, in certain types of stores (most notably supermarkets) the terminal operator moves around constantly while performing routine operations, such as handling groceries, accepting coupons, making change, etc. During this constant and sometimes nearly frantic activity, a freestanding keyboard unit can be jarred out of position. Since many operators enter data by touch only, an operator who is not aware that the keyboard has been jarred out of position may cause incorrect data to be entered. In an extreme case, a freestanding keyboard may even be jarred to the floor and damaged.

SUMMARY

The present invention is a data entry terminal which overcomes the above-discussed problems with prior art terminals. A terminal constructed in accordance with the present invention can be readily configured either as a distributed device or as an integrated device having a keyboard securely attached to a base unit. Assembly and conversion operations are carried out without the use of tools or separate fasteners.

In a preferred embodiment of the invention, the data entry terminal includes a keyboard unit having guide means at an exterior surface and electrical circuitry for carrying key entry signals. The circuitry terminates in an electrical connector located at a predetermined position on the exterior surface of the keyboard unit. The terminal further includes a base unit having guide means complementary to the keyboard unit guide means and electrical circuitry terminating in an electrical connector complementary to the keyboard unit connector. The keyboard unit can be positioned either in an integrated configuration in which it is secured to the base unit by the complementary guide means with the connectors being in direct contact or as a freestanding unit in a distributed configuration wherein the connectors are electrically coupled through an auxiliary cable.

BRIEF DESCRIPTION OF THE DRAWINGS

While the specification concludes with claims particularly pointing out and distinctly claiming that which is regarded as the present invention, further details of a preferred embodiment of the invention may be more readily ascertained from the following detailed description when read in conjunction with the accompanying drawings wherein:

FIG. 2 is a partial perspective view of the base unit of the terminal of FIG. 1 showing the base unit guides and connector in greater detail;

FIG. 3 is a partial top view of the keyboard unit for the terminal shown in FIG. 1;

FIG. 4 is a rear elevation view of the keyboard unit;

DETAILED DESCRIPTION

Figure 1:
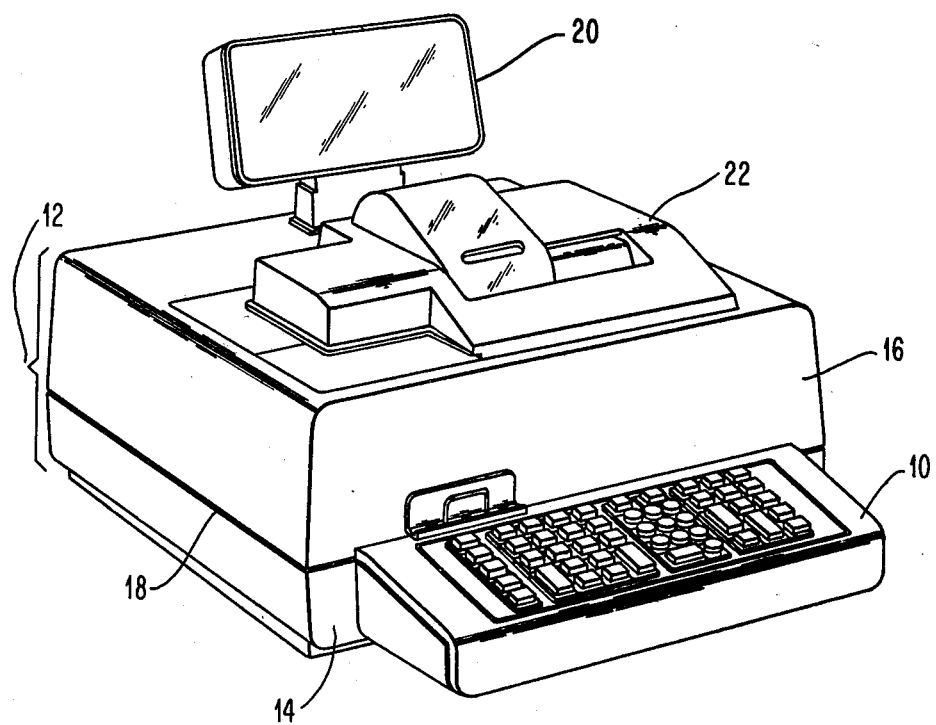
FIG. 1 is a perspective view of a data entry terminal constructed in accordance with the present invention in its integrated configuration.

One configuration which a data entry terminal constructed in accordance with the present invention can take is an integrated configuration shown in FIG. 1. In such a configuration, a keyboard unit 10 is secured to a terminal housing 12 including a base unit 14 and a cover unit 16. The cover unit 16 rests on an inwardly-extending ledge 18 at the upper edge of base unit 14. Base unit 14 includes a concealed upwardly-extending lip at the inner edge of the ledge to prevent horizontal movement of the cover unit 16 relative to the base unit 14.

The cover unit 16 may also support a display unit 20 typically used to display entered data and to guide terminal operators through transactions. A printer access cover 22 permits the terminal operator to gain access to one or more print stations in the terminal. The individual print stations are used to provide customer receipts, printed journal tapes and similar written records.

While the keyboard unit 10 may appear to be securely fastened to the terminal housing 12 in an integrated terminal configuration, it can readily be detached from the terminal housing without the use of tools once the cover unit 16 is lifted clear of the forward wall of base unit 14.

The assembly and removal of keyboard units 10 without the use of tools is made possible through the use of interlocking guides on keyboard unit 10 and base unit 14 and by the use of complementary, aligned connectors on those two components. FIG. 2 shows the base unit guides and connector when the cover unit 16 and the keyboard unit 10 are removed. The base unit 14 has a generally rectangular recess 24 in its front wall. The recess 24 extends from the upper edge 18 of the base unit 14 to a lower edge 26 and is defined, in part, by edge areas 23 and 30 leading to an inner wall 32. Inner wall 32 is parallel to the outer wall of the base unit 14. The edge 38 includes a transverse panel 34 forming a bridge between the outer wall of the base unit 14 and the inner wall 32. The outer wall of base unit 14 includes an extension or rib 36 which, in combination with the inner wall 32, defines a recess at panel 34. The lower end of the recess has a shoulder 38.

Edge 30 similarly includes a recess defined by a transverse panel 40 and by an extension or rib 42 in the outer wall of the base unit 14. A shoulder (not shown) similar to shoulder 38 is located at lower edge of the recess.

A female electrical connector 44 is secured to the inner wall 32 at the lower edge of the recess. Connector 44 is the termination for a multi-wire cable from electronic circuitry within the terminal housing 12. As will be explained in more detail later, connector 44 is designed to move freely within certain limits to facilitate insertion of a connector associated with the keyboard unit 12 of the terminal.

The base unit wall structure at the edges 23 and 30 forms vertical guides which can be used to guide keyboard unit 12 into place to provide an integrated terminal configuration. Keyboard unit 10 carries a male connector 56, shown only in FIG. 4, received by connector 44 in the integrated configuration. Referring to FIG. 3, keyboard unit 10 includes guides means complementary to the guide means formed at the opposite ends of the recess 24. More specifically, first and second recesses 46 and 48 are provided at the left and right edges, respectively, of keyboard unit 10 adjacent to its rear wall 50. Recess 46 is defined, in part, by a generally rectangular extension or rib 52 having a shape and size generally complementary to the recess defined by extension 36, panel 34 and inner wall 32 of the base unit 14. The recess 46 on keyboard unit 10 is also generally complementary to the extension 36. The guide structure, comprising recess 48 and generally rectangular extension 54, at the right side of keyboard unit 10 are complementary to the guide formed by extension 42, panel 40 and inner wall 32.

To secure the keyboard unit 10 to the terminal housing 12, the cover unit 16 must be removed or at least moved away from the front wall of the base unit 14 to expose the upper edge of the recess 24. The keyboard unit 10 is lowered into position with the complementary guide structures serving to align and limit movement of the keyboard unit 10 relative to the base unit 14. As the keyboard unit 10 is lowered into position, the keyboard male connector 56 enters base unit connector 44 to establish the electrical link between the keyboard circuitry and the terminal circuitry within the terminal housing 12. The bottom surfaces of the extensions 52 and 54 on keyboard unit 10 rest on shoulder 38 and the corresponding shoulder at the right edge of recess 24. The interlocking guides are relied upon to limit horizontal movement of the keyboard unit 10. Upward movement of the keyboard unit 10 is prevented by replacing the cover unit 16, which overlies a portion of the keyboard unit 10.

Figure 5:
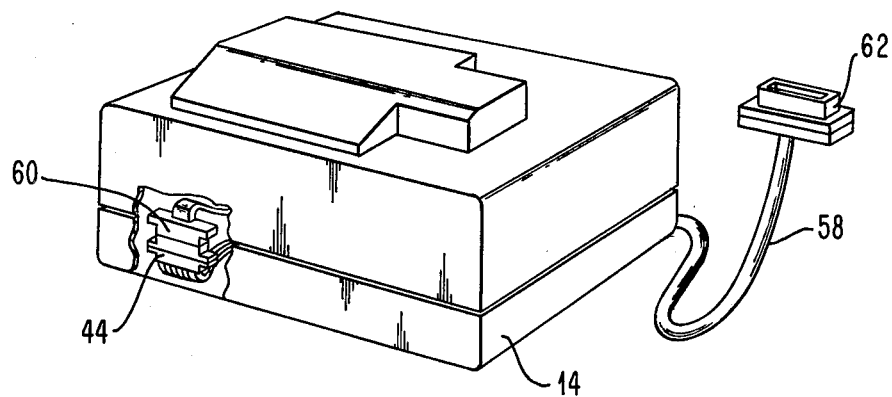
FIG. 5 is a perspective view of a base unit in a distributed configuration with a portion of the base unit being cut away to show connector details.

When the cover unit 16 is in position, the keyboard unit 10 is, to all appearances, integral with or at least secured to the terminal housing 12. However, the terminal can be readily converted from an integrated configuration to a distributed configuration without the use of tools. The conversion process is the reverse of the assembly process. That is, after cover unit 16 is removed from the base unit 14, the keyboard unit 10 is lifted from its rest position to withdraw the keyboard connector 56 from the base unit connector 44. When the keyboard unit 10 is clear of the base unit 14, an auxiliary cable is used to link the keyboard connector 56 to the base unit connector 44. Referring to FIG. 5, each end of the auxiliary cable 58 is provided with a connector complementary to the adjacent connector on the base unit 14 or keyboard unit 10. A male connector 60 is plugged directly into the base unit connector 44. The cable 58 is preferably routed through the terminal housing 12 to an exit point (not shown) at the bottom or rear of housing 12. From that point, cable 58 is routed to the desired location for the freestanding keyboard unit 10 in the distributed configuration. The free end of auxiliary cable 58 is provided with a female connector 62 which is secured to the male connector 56 on keyboard unit 10 by a suitable locking mechanism.

Figure 6:
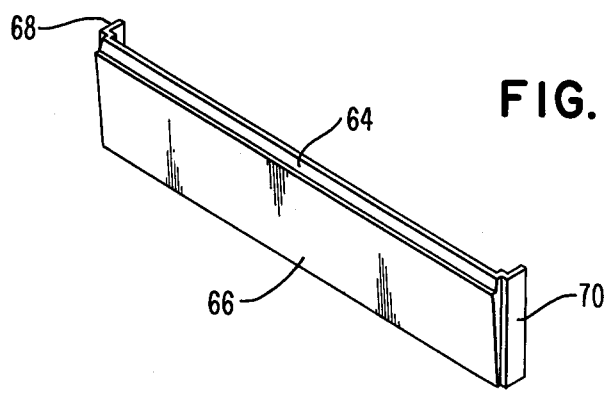
FIG. 6 is a perspective view of a filler panel which is used in combination with the base unit in a distributed configuration.

To convert the terminal housing 12 from an integrated configuration to a distributed configuration, the recess 24 is covered by a filler plate 64, shown in perspective view in FIG. 6. The filler panel 64 includes a central panel 66, which conforms to the shape of the outer wall of base unit 14, and generally L-shaped members 68 and 70 at its left and right ends, respectively. Members 68 and 70 have a sliding fit with the walls of the guide members at opposite ends of recess 24 in base unit 14. The filler panel 64 is dropped into position to close the recess and to provide a continuous surface as can be seen by brief reference to FIG. 5. No fasteners are needed to secure the filler panel 64 since it is held in place by the structure of base unit 14 and by the cover unit 16.

Figure 7:
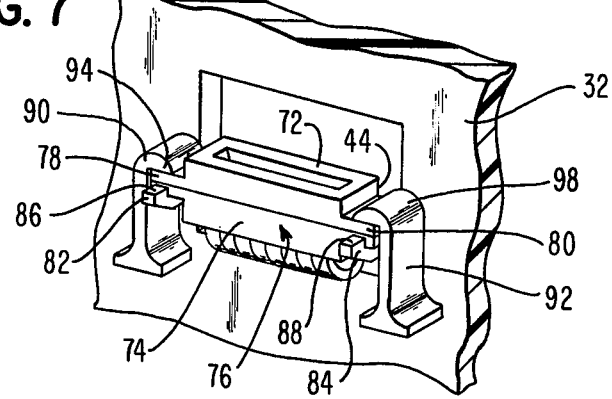
FIG. 7 is an enlarged view of the base unit connector.

As was indicated earlier in the specification, the base unit connector 44 is allowed to move freely within limits in order to compensate for any possible misalignment between connector 44 and connector 56 on the keyboard unit 10. The details of a connector retaining structure for providing this floating mount are shown in FIG. 7. The connector 44 preferably includes a generally rectangular outer end 72, a similar inner end 74 and a longer central section 76 having arms 78 and 80. The arms 78 and 80 rest in oversized recesses in cantilevered support members 82 and 84 which are integral with the base unit 14. The recesses in the support members 82 and 84 are defined in part by upwardly extending tabs 86 and 88 which limit movement of the connector 44 away from the inner wall 32. Upward movement of the connector 44 is limited by arms 90 and 92 having hooks 94 and 98, respectively, which overlie the top surfaces of the arms 78 and 80 on connector 44. The arms 90 and 92 are molded from a material having enough resiliency to allow the arms to be spread apart when inserting the connector 44 into position in the cantilevered support members 82 and 84. When the arms 90 and 92 are released, the resiliency of the material causes the hooked portions 94 and 98 to converge into a position overlying the ends of the connector 44. Preferably, the upper ends of the arms 90 and 92 are curved to permit the arms to be spread apart simply by forcing the connector 44 vertically downward to cam the arms apart until the upper surfaces of the connector clear the hooked portions 94 and 98.

From the foregoing description, it should be clear that the terminal structure permits the same keyboard unit to be used in either an integrated configuration in which the keyboard unit is firmly secured to the base unit or in a distributed configuration in which the two units are electrically connected through an auxiliary cable. Conversion from an integrated configuration to a distributed configuration can be performed without the use of tools at a customer's location simply by lifting the keyboard unit away from the base unit once the cover of the terminal is set aside, plugging one end of the auxiliary cable into the base unit connector, routing the cable through the terminal housing to a desired exit point at the base or rear of the housing and mating the connector at the opposite end of the auxiliary cable with the keyboard unit connector. The conversion operation is completed by inserting the filler panel to conceal the recess in the base unit and replacing the cover unit 16.

In addition to the ease of conversion between integrated and distributed configurations, there are other obvious advantages to the illustrated terminal design. Initial assembly of the keyboard unit to the base unit in an integrated configuration requires no tools and no alignment steps since the keyboard unit is both aligned and held by the complementary guides on the keyboard and base units. Electrical connection is automatically completed upon movement of the keyboard unit into position. Moreover, the use of the same base unit and same keyboard unit for both the integrated and distributed configurations represents a substantial savings since there is no need for separate products, separate sets of spare parts and so on.

While there has been described what is considered to be a preferred embodiment of the invention, variations and modifications therein may occur to those skilled in the art once they become familiar with the basic concepts of the invention. Therefore, it is intended that the appended claims shall be construed to include both the preferred embodiment and all variations and modifications that fall within the true spirit and scope of the invention.

Having thus described my invention, what I claim as new, and desire to secure by Letters Patent is:

1. A data processing terminal which is readily convertible from an integrated configuration to a distributed configuration, said terminal comprising:
   a base unit having guide means at one wall and electrical circuitry terminating in an electrical connector at the same wall;
   a keyboard unit having guide means at an exterior surface thereof complementary to the base unit guide means and electrical circuitry terminating in an electrical connector complementary to said base unit connector, said keyboard unit being positionable either in an integrated configuration wherein it is secured to said base unit by said complementary guide means with said connectors being in direct contact or in a distributed configuration spaced from said base unit with said connectors being electrically coupled through an auxiliary cable; and
   a filler panel comprising a central panel having guide means at opposite side edges similar in configuration to said keyboard unit guide means, said filler panel being adapted to conceal the base unit electrical connector when the terminal has a distributed configuration.

2. A data processing terminal as defined in claim 1 wherein said base unit further includes a generally rectangular recess in a front wall thereof for receiving said keyboard unit in an integrated configuration and said filler panel in a distributed configuration, said recess being defined by opposite side edges extending inwardly from an outer wall of said base unit to an inner wall, said inner wall being generally parallel to said outer wall.

3. A data processing terminal as defined in claim 2 wherein said base unit guide means comprises first and second ribs at the opposite side edges of said recess, said ribs being spaced a predetermined distance from said inner wall, and wherein said keyboard unit guide means comprises first and second recesses in opposite side walls of said keyboard unit, said recesses being alignable with said ribs to enable said keyboard unit to be guided into an integrated position on said base unit.

4. A data processing terminal as defined in claim 3, wherein said base unit connector extends upwardly within said base unit recess at a predetermined distance from one side wall of the recess while said keyboard unit connector extends downwardly at a rear wall of said keyboard unit at the same predetermined distance from the corresponding side wall of said keyboard unit, said connectors being brought into contact when said keyboard unit is mounted on said base unit using said complementary guide means.

5. A data processing terminal as defined in claim 4 further including means for mounting said base unit connector for limited movement relative to said base unit to facilitate coupling of the two connectors when the keyboard unit is mounted in an integrated position.

6. A data processing terminal as defined in claim 4, wherein said base unit connector comprises a female connector having an upwardly-extending opening while said keyboard unit connector comprises a downwardly-extending male connector.

7. A data processing terminal as defined in claim 5, wherein said base unit connector comprises a female connector having an upwardly-extending opening while said keyboard unit connector comprises a downwardly-extending male connector.

* * * * *